United States Patent [19]

Markovitz

[11] Patent Number: 4,906,711
[45] Date of Patent: Mar. 6, 1990

[54] LOW VISCOSITY EPOXY RESIN COMPOSITIONS

[75] Inventor: Mark Markovitz, Schenectady, N.Y.

[73] Assignee: General Electric Company, Schenectady, N.Y.

[21] Appl. No.: 226,114

[22] Filed: Jul. 29, 1988

[51] Int. Cl.$^4$ .................. C08G 59/40; C08G 59/68
[52] U.S. Cl. .................... 525/504; 525/529; 528/94; 528/361; 528/393
[58] Field of Search .............. 528/91, 94, 361, 393; 525/504, 529

[56] References Cited

U.S. PATENT DOCUMENTS 2,939,859  6/1960  Rumscheidt et al. ............ 528/93 X
3,293,322 12/1966  Pennino ........................ 528/91 X
3,438,937  4/1969  Christie ........................ 528/393 X
4,379,908  4/1983  Brownscombe ................. 528/91
4,410,680 10/1983  Brownscombe et al. ...... 528/393 X Primary Examiner—Earl Neilsen
Attorney, Agent, or Firm—Jerome C. Squillaro

[57] ABSTRACT

The viscosities of solventless compositions of epoxy resins containing 1,2 epoxy groups and having at least two epoxide groups per molecule and effective amounts of hardener are markedly reduced whereby they are useful for vacuum-pressure impregnation, pre-impregnation electrical insulating material and structural composite applications by addition of a reactive diluent comprising an aromatic vinyl monomer.

9 Claims, No Drawings

LOW VISCOSITY EPOXY RESIN COMPOSITIONS

FIELD OF THE INVENTION

This invention relates generally to epoxy resin technology and is more particularly concerned with novel epoxy resin compositions having special utility in electrical insulation composites and other applications requiring completely reactive, low viscosity resins.

BACKGROUND OF THE INVENTION

In the manufacture of electrical equipment, electrical insulation is provided in the form of glass fabric, thermoplastic film, and mica paper or mica flake tapes which are impregnated with curable polymeric materials. The fabric, film, paper or tape or other suitable form is either treated with polymeric material before application to a conductor, i.e., pre-impregnated, or afterward as by the vacuum-pressure impregnation technique employed in the production of coils for motors and generators. In either case, the resin composition must be applied and cured in place without voids which reduce useful life of the insulation as a result of breakdown under electrical stress. For this reason, the resin composition must be effectively solvent free and at that same time it must be of relatively low viscosity for easy flow around and between the laps of insulating tape of a coil and for similarly efficient penetration in the preparation of pre-impregnated materials. While relatively low viscosities are less critical for preparing pre-impregnated insulation because the impregnation temperature can be increased to decrease viscosity, the tendency towards reaction or gelation at such elevated temperatures precludes the use of some otherwise desirable high viscosity compositions from use for pre-impregnated insulation.

Epoxy resins are usually preferred to polyester resins because of their substantially superior characteristics of thermal stability, adhesion, tensile, flexural and compressive strengths, resistance to solvents, oils, acids and alkalis. However, the viscosity of these resins typically is in the order of about 6,500 to 15,000 centipoises (cps). Moreover, when certain conventional hardeners are added to these resins, their viscosities increase to a range of about 10,000 to 30,000 cps, which is much too high for useful impregnation applications. Many high performance resins such as epoxy novolacs or epoxy cresol novolacs are solids or substantially solid at room temperature whereby they typically require the addition of solvents to be utilized as a liquid. Although high viscosities can be reduced substantially through the use of certain epoxy diluents, prior efforts in employing this measure have resulted in reduced thermal stability of the modified compositions as well as detracting from the electrical and mechanical properties of the cured resin.

SUMMARY OF THE INVENTION

On the basis of my surprising discovery set forth below, it is now possible to provide epoxy resin compositions having special utility in vacuum-pressure impregnation applications by virtue of their both good thermal stability and low viscosity at 25° C., of the order of less than 3,000 cps and even below 1,000 cps in certain cases. It is also now possible to provide epoxy resin compositions having special utility in the preparation of preimpregnated insulation because of their good stability at the elevated temperatures to which they must be heated to reduce their viscosities to levels necessary for effective penetration and impregnation. The epoxy resin compositions of this invention can be used for composites containing resin and reinforcement, such as glass or carbon fibers, due to the facile wet out of the reinforcing material with the low viscosity resins. Further, these new results can be consistently obtained without incurring any offsetting disadvantages such as a detrimental effect upon the desired electrical or physical properties of the epoxy resins.

As indicated above, this invention centers in my unexpected finding that there are certain diluent materials which, unlike those such as the epoxy diluents previously unsuccessfully used in attempts to solve this problem, do not diminish thermal stability or any other important property. In particular, I have established that the reactive diluents styrene, alpha-methyl styrene, vinyl toluene, t-butyl styrene, divinyl benzene, diisopropenyl benzene and mixtures thereof are capable of producing these new and important results and advantages of this invention. Vinyl toluene refers to a mixture of the meta- and para-methyl styrene isomers, but a single isomer such as para-methyl styrene may be used. Similarly, t-butyl styrene refers to para-t-butyl styrene or a mixture of the ortho, meta and para isomers. Divinyl benzene and diisopropenyl benzene also refer to one isomer or mixtures of the ortho, meta and para isomers. Further, divinyl benzene may also contain a substantial quantity of ethyl vinyl benzene, a typical analysis of divinyl benzene being 57% divinyl benzene and 38% ethyl vinyl benzene. I have additionally found that these new results and advantages can invariably be obtained when these particular diluents are used individually or together in admixture with the epoxy resin material in amounts from about 3% to 33% of the total compositions.

This invention also is based upon the novel concept of anionically polymerizing styrene and other aromatic vinyl monomers with epoxy resins in the presence of imidazoles. Epoxy resins and styrene or other aromatic vinyl monomers are cationically copolymerized using organo-metallic catalysts and phenolic accelerators in U.S. Letters Pat. No. 4,603,182, issued July 29, 1986. The disclosed contents of this patent is incorporated herein by reference.

This invention comprises the unexpected discovery that styrene and other vinyl monomers polymerize anionically with epoxy resins with the use of imidazole compounds as the hardener.

The use of styrene in the prior art as a reactive diluent included a peroxide catalyst for a free radical polymerization reaction of the styrene, and a separate hardener and catalyst for the epoxide cure. This invention utilizes a single hardener for both the epoxide and the styrene, and no free radical polymerization is involved. Also, unlike the prior art involving use of styrene as a diluent for modified epoxy resins prereacted with maleic anhydride and which were in a peroxide-catalyzed free radical reaction which is susceptible to sudden and catastrophic viscosity increase, the compositions of this invention do not contain peroxide or acid anhydride. Acid anhydrides in epoxy resins are susceptible to hydrolysis by moisture which forms polyacids and further reduce the shelf life stability.

Those skilled in the art will understand that there are possible applications of this new chemistry in addition to vacuum-pressure impregnation resins and resins for making electrical insulation prepregs, and that those applications include thermosetting resins of the epoxy and polyester classes for production of resin-glass laminations, coating, molding and potting compounds, tooling and the like.

Broadly and generally described then, the present invention is a thermosetting resin composition which has superior thermal stability and consists essentially of between about 50% and 95% of a 1,2 epoxy resin having at least two epoxide groups per molecule, between about 3% and 33% of a reactive diluent selected from the group recited above, and containing small but effective amounts of an imidazole compound.

DETAILED DESCRIPTION OF THE INVENTION

As indicated above, one has a comparatively wide variety of materials from which to choose in practicing this invention. Thus, the new results and advantages generally can be consistently obtained through the use of any thermosetting epoxy resin of the above described general class of admixtures thereof. Included among those suitable or especially desirable in the practice of this invention are bisphenol A diglycidyl ether epoxy resins (such as those sold under the trademarks EPON 826 and EPON 828 by Shell Chemical Co.). Other liquid resins of this formulation (such as those marketed under the trademarks DER 330, 331 and 332 by Dow Chemical Company, Epi-Rz 508, 509, and 510 by Celanese Corporation and Araldite 6004, 6005 and 6010 by Ciba-Geigy). Still other suitable resins of this type are epoxy novolac resins (such as DEN 431 and DEN 438 of Dow Chemical Company and Epi-Rz SU-2.5 of Celanese Corp.), epoxy cresol novolac resins (such as the commercial products ECN 1235, 1273 and 1299 marketed by Ciba-Geigy), halogenated epoxy resins (such as Araldite 8061 of Ciba-Geigy) and cycloaliphatic epoxy resins (such as ERL 4206, 4221, 4221E, 4234, 4090 and 4289 of Union Carbide and Araldite CY 182 and 183 of Ciba-Geigy).

The hardener for the epoxy resin, or mixture of such resins, comprises imidazole, 1-methylimidazole, 2-methylimidazole, 1,2-dimethylimidazole, 2-ethylimidazole, 1-cyanoethyl-2-ethyl-4-methylimidazole, 2-phenylimidazole, 2,4-dimethylimidazole, 2-ethyl-4-methylimidazole, 2-undecylimidazole, 2-heptadecylimidazole, 1-benzyl-2-methylimidazole, and other imidazole derivatives. The compositions containing imidazoles are fast curing when heated to about 80° to 100° C., with a pot life that is usually less than about two to four weeks at room temperature. The proportion of the hardener content can be about 1 to 10 parts by weight (pbw) per 100 pbw of the epoxy - diluent composition, with the preferred range of hardener being about 2 to 6 parts by weight.

The reactive diluent which decreases viscosity of the thermosetting compositions using the epoxy resins and the hardener, will be added at the time of the operator's choosing in the sequence of compounding the constituents of the mixture and will be one or another or a mixture of those particular compounds which I have discovered to be surprisingly effective in this respect. In particular, styrene, alphamethyl styrene, an isomer or mixture of isomers of vinyl toluene, of t-butyl styrene,, of divinyl benzene, and of diisopraplenyl benzene, and mixtures thereof, are the compounds of choice within the scope of this invention to produce the surprising viscosity-decreasing effects which are necessary to consistently gain the new results and advantages of this invention. The amount of this reactive diluent or combination of diluents used in the mixture of this invention will be between about 3% and 33% of the total composition, it being my further discovery that within that range, these new results and advantages can be obtained and that beyond that range, the results are either not consistently obtainable or there are detrimental effects of another nature, particularly on the high side of the range.

Those skilled in the art will gain a further and better understanding of the present invention and the new results and advantages thereof from the following illustrative, but not limiting, examples of the practice of this invention as it has actually been carried out experimentally.

EXAMPLE 1

The viscosity of EPON 828 epoxy resin was decreased from approximately 13,000 cps down to about 1,200 cps at 25° C. by adding thereto 10% of vinyl toluene. A clear amber, tough solid was formed when this reduced viscosity epoxy resin was cured at 60° to 100° C. with either 5.0 or 10.0 pbw of 2-ethyl-4-methylimidazole or 1,2-dimethylimidazole per 100 pbw of the 90/10 EPON 828/vinyl toluene solution.

Using the ASTM test method D628-72, the heat deflection temperature (HDT) at 264 psi was 92° C. for the resin containing 5.0 pbw of the 2-ethyl-4-methylimidazole, and 94° C. for the resin containing 5.0 pbw of 1,2-dimethylimidazole after a cure of 3.0 hours at 160° C.

EXAMPLE 2

The novolac DEN 438 epoxy resin is essentially a solid at room temperature. A solution comprising 85 pbw of DEN 438 and 15 pbw of vinyl toluene provided a pourable liquid at room temperature. A solventless resin produced from DEN 438 (85 pbw) and vinyl toluene (15 pbw) with 3.0 pbw of 2-ethyl-4-methylimidazole cured to a clear amber, tough solid having a heat defection temperature of 155° C. after curing 4 hours at 160° C. The HDT was 144° C. when 1,2-dimethylimidazole was used in place of the 2-ethyl-4-methylimidazole.

EXAMPLE 3

A resin having a viscosity of approximately 5,000 cps was made from the nearly solid DEN 438 epoxy novolac in amounts of 80 pbw with 20 pbw of vinyl toluene. This resin solution (100 pbw) was catalyzed with 3.0 pbw of EMI-24. The resin cured to clear amber, tough solid with a 138° C. heat deflection temperature after 4 hours at 160° C.

EXAMPLE 4

The viscosity of EPON 826 epoxy resin was decreased from approximately 8,000 cps down to 1,000 cps by the addition of 10.0 pbw of vinyl toluene to 90.0 pbw of the resin. The epoxy vinyl toluene resin (100 pbw) was catalyzed with 2.7 pbw of 2-ethyl-4-methylimidazole and cured 15 hours at 150° C. The heat deflection temperature was 139° C. A 10-gram, 2.5-inch diameter disc of the cured resin showed no weight change after aging 72 hours at 160° C., which indicates complete reaction of the vinyl toluene.

A similar evaluation using EPON 826 (90.0 pbw) with vinyl toluene (10.0 pbw) and triethylene tetramine (12.6 pbw) gave a heat deflection temperature of 106° C.

A cured disc sample lost weight when cured 72 hours at 160° C., indicating the presence of unreacted vinyl toluene.

EXAMPLE 5

The viscosity of EPON 826 epoxy resin was decreased from approximately 8,000 cps down to 400 cps by the addition of 15.0 pbw of vinyl toluene to 85.0 pbw of the epoxy resin. The epoxy-vinyl toluene resin (100.0 pbw) was catalyzed with 2.6 pbw of 2-ethyl-4methylimidazole and cured 15 hours at 150° C. The heat deflection temperature was 135° C. A disc specimen of the cured epoxy resin lost no weight when aged 72 hours at 160° C., which indicates the absence of any free (unreacted) vinyl toluene.

A similar test using EPON 826 resin (85.0 pbw) with vinyl toluene (15.0 pbw) and triethylene tetramine (11.9 pbw) provided a heat deflection temperature of 104° C. after a cure of 15 hours at 150° C. Aging of a cured disc specimen at 72 hours at 160° C. resulted in a significant weight loss, indicating the presence of unreacted vinyl toluene.

EXAMPLE 6

Resin specimen No. 6A was made from EPON 826 epoxy (100.0 pbw) and 2-ethyl-4-methylimidazole (3.0 pbw). Resin specimen No. 6B was made from EPON 826 epoxy (100.0 pbw) with vinyl toluene (18.2 pbw) and 2-ethyl-4-methylimidazole (3.0 pbw). The percent weight loss of the specimens, as a measure of thermal stability, was compared after a sample of each was aged 84 days at different temperatures, namely 200° C., 220° C. and 230° C. Comparisons were also made after 14 days aging at 260° C. The sample of each specimen for the thermal stability determinations were all 10-gram, 2.5-inch diameter discs. The respective weight losses were as follows:

|  | Percent Weight Loss | | | |
| --- | --- | --- | --- | --- |
| Specimen | 84 days @ 200° C. | 84 days @ 220° C. | 84 days @ 230° C. | 14 days @ 260° C. |
| No. 6A | 3.88 | 5.16 | 8.43 | 14.68 |
| No. 6B | 3.83 | 4.78 | 7.04 | 8.25 |

The comparative evaluation demonstrates that the weight loss was lower with the samples including 15% vinyl toluene (Specimen No. 6B). This establishes that improved thermal stability is provided by the addition of the vinyl toluene. In contrast thereto, the use of conventional epoxy diluents, such as butyl glycidyl ether or phenyl glycidyl either, to reduce viscosity results in reduced thermal stability in relation to the higher viscosity, unmodified epoxy resin.

EXAMPLE 7

The preparations of thermally stable test specimens of DEN 438 epoxy novolac resin (100.0 pbw) with 2-ethyl-4-methylimidazole (3.0 pbw) is difficult because of the need to heat the DEN 438 resin to reduce its viscosity. Heating caused rapid gelation when the hot epoxy resin was catalyzed with the 2-ethyl-4-methylimidazole. However, when the DEN 438 epoxy resin was diluted with vinyl toluene in amounts of either 15 or 20% it constituted an easily handlable liquid at room temperature. Disc samples for testing thermal stability were made from specimens of DEN 438 resin with 15% vinyl toluene (No. 7A) and 20% vinyl toluene (No. 7B). The composition of specimen No. 7A consisted of the DEN 438 epoxy resin (100.0 pbw), vinyl toluene (18.2 pbw) and 2-ethyl-4-methylimidazole (3.0 pbw), and specimen No. 7B consisted of DEN 438 resin (100.0 pbw), vinyl toluene (25.8 pbw) and 2-ethyl-4-methylimidazole (3.0 pbw). The respective weight losses were as follows:

|  | Percent Weight Loss | | | |
| --- | --- | --- | --- | --- |
| Specimen | 84 days @ 200° C. | 84 days @ 220° C. | 84 days @ 230° C. | 14 days @ 260° C. |
| No. 7A | 1.77 | 3.35 | 6.88 | 9.28 |
| No. 7B | 1.68 | 2.93 | 6.21 | 8.44 |

This thermal stability evaluation demonstrates that increasing the vinyl toluene content from 15% up to 20% produced an improvement in thermal stability. This again is a phenomenon which is contrary to the result of using conventional epoxy diluents since they cause increasing deterioration of thermal stability as their amount increases.

Throughout this specification and the appended claims, whatever percentage or proportion is recited, reference is to the weight basis unless otherwise expressly stated.

Having thus described the present invention in compliance with applicable statutory requirements, I state that what I desire to secure by Letters Patent is defined in what is claimed:

1. A thermosetting resin composition having superior thermal stability consisting essentially of between about 50% and about 95% by weight of 1,2 epoxy resin having at least two epoxide groups per molecule, between about 3% and 33% by weight of a reactive diluent selected from an aromatic vinyl monomer, and between about 1 and 10 parts by weight (pbw) per 100 pbw of the epoxy resin and the reactive diluent of a nitrogen containing organic catalyst hardener selected from the group consisting of an imidazole compound.

2. The thermosetting resin composition of claim 1, wherein the imidazole compound catalyst hardener is selected from the group consisting of imidazole, 1-methylimidazole, 2-methylimidazole, 1,2-dimethylimidazole, 2-ethylimidazole, 1-cyanoethyl-2-ethyl-4-methylimidazole, 2-phenylimidazole, 2,4-dimethylimidazole, 2-ethyl-4-methylimidazole, 2-undecylimidazole, 2-heptadecylimidazole, and 1-benzyl-2-methyl-imidazole, and mixtures thereof.

3. The thermosetting resin composition of claim 1, wherein the epoxy resin amount is about 50% to about 95% by weight and the aromatic vinyl monomer reactive diluent amount is about 3% to about 33% by weight, and the nitrogen containing organic catalyst hardener is combined therewith in amount of about 2 to about 6 pbw per 100 pbw of the epoxy resin and reactive diluent.

4. The thermosetting resin composition of claim 1 wherein the reactive diluent is vinyl toluene.

5. A thermosetting resin composition having superior thermal stability consisting essentially of between about 50% and about 95% by weight of 1,2 epoxy resin having at least two epoxide groups per molecule, between about 3% and about 33% by weight of a reactive diluent selected from an aromatic vinyl monomer, and between about 1 and about 10 pbw per 100 pbw of the epoxy resin and the reactive diluent of an imidazole compound catalyst hardener.

6. The thermosetting resin composition of claim 5, wherein the imidazole compound catalyst hardener is between about 2 and about 6 pbw per 100 pbw of the epoxy resin and the reactive diluent.

7. The thermosetting resin composition of claim 5, wherein the imidazole compound catalyst hardener is selected from the group consisting of imidazole, 1-methylimidazole, 2-methylimidazole, 1,2-dimethylimidazole, 2-ethylimidazle, 1-cyanoethyl-2-ethyl-4-methylimidazole, 2-phenylimidazole, 2,4-dimethylimidazole, 2-ethyl-4-methylimidazole, 2-undecylimidazole, 2-heptdecylimidazole, and 1 benzyl-2-methylimidazole, and mixtures thereof.

8. The thermosetting resin composition of claim 5, wherein the reactive diluent is vinyl toluene.

9. The thermosetting resin composition of claim 5, wherein the catalyst hardener is 2-ethyl-4-methylimidazole.

* * * * *